United States Patent
Pettyjohn et al.

(10) Patent No.: US 9,595,063 B2
(45) Date of Patent: *Mar. 14, 2017

(54) LOCATING PRODUCTS IN STORES USING VOICE SEARCH FROM A COMMUNICATION DEVICE

(71) Applicant: aisle411, Inc., Saint Louis, MO (US)

(72) Inventors: Nathan Pettyjohn, Saint Louis, MO (US); Matthew Kulig, Millstadt, IL (US); Niarcas Jeffrey, Cincinnati, OH (US); Edward Saunders, Saint Louis, MO (US)

(73) Assignee: aisle411, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,113

(22) Filed: Jul. 30, 2015

(65) Prior Publication Data

US 2015/0339761 A1   Nov. 26, 2015

Related U.S. Application Data

(63) Continuation of application No. 13/461,738, filed on May 1, 2012, now Pat. No. 9,147,212, which is a
(Continued)

(51) Int. Cl.
*G06Q 30/06* (2012.01)
*H04W 4/02* (2009.01)
(Continued)

(52) U.S. Cl.
CPC ..... *G06Q 30/0639* (2013.01); *G06Q 30/0603* (2013.01); *G10L 15/22* (2013.01);
(Continued)

(58) Field of Classification Search
CPC ........................... H04M 3/42348; G10L 15/26
(Continued)

(56) References Cited

U.S. PATENT DOCUMENTS 5,111,501 A   5/1992   Shimanuki
5,222,121 A   6/1993   Shimada
(Continued)

OTHER PUBLICATIONS

Michael Bacchini, Francoise Beaufays, Johan Schalwyk, Mike Schuster, Brian Strope,"Deploying GOOG-411: Early Lessons in Data, Measurement, and Testing," by Google, Inc., White Paper, USA, 4 pages.

*Primary Examiner* — Md S Elahee
(74) *Attorney, Agent, or Firm* — Lewis Rice LLC

(57) ABSTRACT

A user can locate products by dialing a number from any phone and accessing an automatic voice recognition system. Reply is made to the user with information locating the product using a store's product location data converted to automatic voice responses. smart phone and mobile web access to a product database is enabled using voice-to-text and text search. A taxonomy enables product search requests by product descriptions and/or product brand names, and enable synonyms and phonetic enhancements to the system. Search results are related to products and product categories with concise organization. Relevant advertisements, promotional offers and coupons are delivered based upon search and taxonomy elements. Search requests generate dynamic interior maps of a products location inside the shoppers' location, assisting a shopper to efficiently shop the location for listed items. Business intelligence of product categories enable rapid scaling across retail segments.

8 Claims, 13 Drawing Sheets

Related U.S. Application Data continuation-in-part of application No. 12/134,187, filed on Jun. 5, 2008, now abandoned.

(60) Provisional application No. 61/481,657, filed on May 2, 2011.

(51) Int. Cl.
  *H04M 3/493* (2006.01)
  *G10L 15/22* (2006.01)
  *G10L 15/26* (2006.01)
  *H04M 3/42* (2006.01)
  *G10L 15/18* (2013.01)

(52) U.S. Cl.
  CPC ........... *G10L 15/26* (2013.01); *H04M 3/4936* (2013.01); *H04W 4/02* (2013.01); *G10L 15/1822* (2013.01); *G10L 2015/223* (2013.01); *H04M 3/42348* (2013.01); *H04M 2201/40* (2013.01); *H04M 2203/1058* (2013.01); *H04M 2203/355* (2013.01); *H04M 2250/74* (2013.01)

(58) Field of Classification Search
  USPC ....... 379/88.01–88.04, 88.14, 88.17, 201.06, 379/201.1; 704/9; 705/80, 14.1; 707/722
  See application file for complete search history.

(56) References Cited

U.S. PATENT DOCUMENTS

| | | | |
|---|---|---|---|
| 5,231,670 A | 7/1993 | Goldhor et al. | |
| 5,671,328 A | 9/1997 | Fitzpatrick et al. | |
| 5,850,627 A | 12/1998 | Gould et al. | |
| 6,092,045 A | 7/2000 | Stubley et al. | |
| 6,157,705 A | 12/2000 | Perrone | |
| 6,533,173 B2 | 3/2003 | Benyak | |
| 6,807,574 B1 | 10/2004 | Partovi et al. | |
| 6,813,341 B1 * | 11/2004 | Mahoney | G06Q 10/087 379/88.01 |
| 7,016,845 B2 | 3/2006 | Vora et al. | |
| 7,027,987 B1 | 4/2006 | Franz et al. | |
| 7,082,392 B1 | 7/2006 | Butler et al. | |
| 7,146,243 B2 | 12/2006 | Glynn | |
| 7,194,069 B1 | 3/2007 | Jones et al. | |
| 7,231,380 B1 | 6/2007 | Pienkos | |
| 7,292,678 B2 | 11/2007 | Glynn et al. | |
| 7,343,290 B2 | 3/2008 | Breuer | |
| 7,366,668 B1 | 4/2008 | Franz et al. | |
| 7,653,183 B2 | 1/2010 | Patel et al. | |
| 7,668,716 B2 | 2/2010 | Helbing et al. | |
| 7,864,929 B2 | 1/2011 | Carro | |
| 7,974,842 B2 | 7/2011 | Helbing et al. | |
| 8,353,452 B2 | 1/2013 | Sharpe et al. | |
| 8,583,628 B2 | 11/2013 | Richter et al. | |
| 8,762,131 B1 | 6/2014 | Diaconescu et al. | |
| 9,147,212 B2 | 9/2015 | Pettyjohn et al. | |
| 2006/0100896 A1 * | 5/2006 | Lahey | G06Q 30/00 705/80 |
| 2007/0165795 A1 | 7/2007 | Haynor | |
| 2007/0210155 A1 | 9/2007 | Swartz et al. | |
| 2009/0304161 A1 | 12/2009 | Pettyjohn | |
| 2010/0205045 A1 * | 8/2010 | Zhang | G06Q 30/02 705/14.1 |
| 2010/0318412 A1 * | 12/2010 | Karypis | G06Q 30/02 705/14.1 |

* cited by examiner

Figure 11
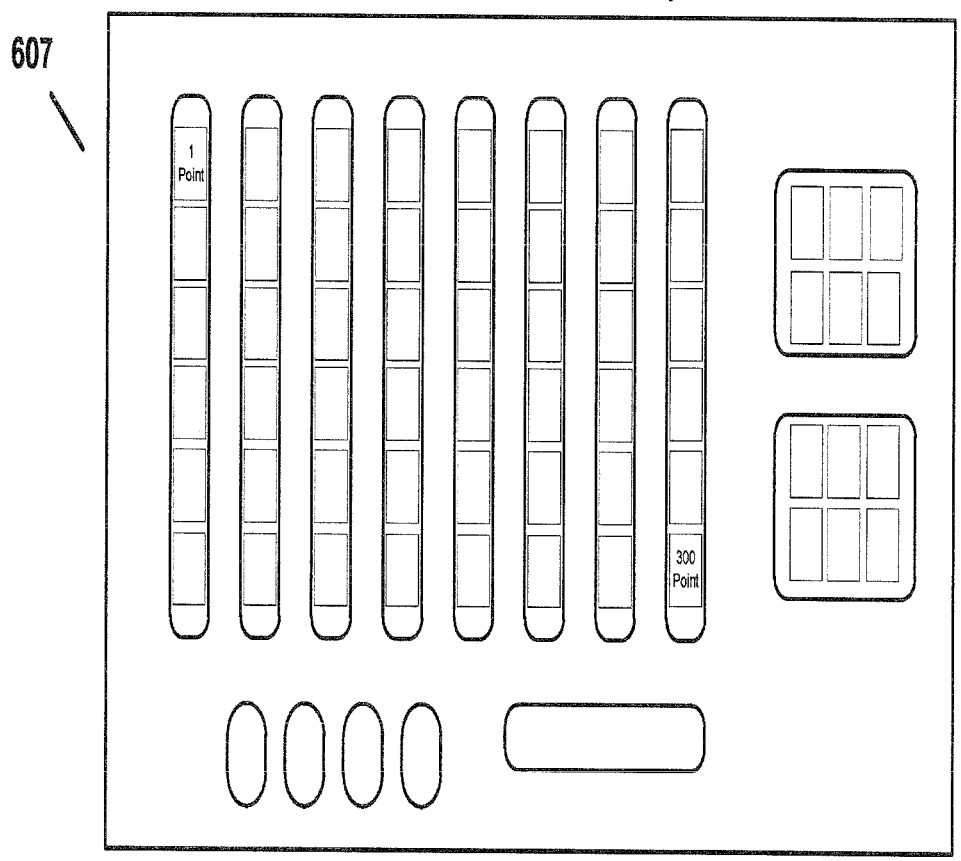
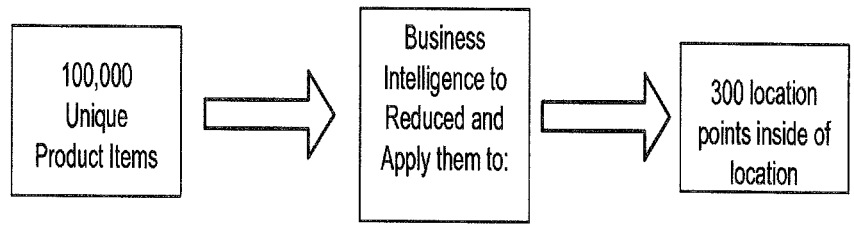

| Item | Synonym | Phonetic | Slang |
|---|---|---|---|
| CARTLIDGEBROWN PINOT NOIR | pinot noir | peenyow nwar | Veeno, Whine |
| C & B WORCESTERSHIRE SAUCE 5OZ | worcestershire sauce | wishter shyer sauce | |
| CHICKEN QUESADILLA FLATBREAD 6OZ | chicken quesadilla | chicken kaysadeea | |
| body conduit pvc t 1/2" | p v c | pee vee see | Plastic Pipe |
| bender conduit3/4thinwal | conduit bender | con dew it bender | |

LOCATING PRODUCTS IN STORES USING VOICE SEARCH FROM A COMMUNICATION DEVICE

CROSS REFERENCE TO RELATED APPLICATIONS

This application is a Continuation of U.S. Utility patent application Ser. No. 13/461,738 filed May 1, 2012, and currently pending, which is, in turn, a Continuation-in-Part of U.S. Utility patent application Ser. No. 12/134,187, filed on Jun. 5, 2008, now abandoned, and which claims benefit of U.S. Provisional Patent Application Ser. No. 61/481,657, filed May 2, 2011. The entire disclosures of all the above applications are incorporated herein by reference.

BACKGROUND

1. Field of the Invention

This disclosure pertains to embodiments of systems that create a voice search and product location assistance (PLA) and methods for locating products in stores, businesses and/or organizations.

2. Description of the Related Art

Customers or users can access kiosks, internal phone systems, mobile text messaging, mobile internet programs and internet connected computers to access a variety of information programs using voice or text search methods to locate product inventory or product pricing from the Internet. There currently exist many phone dial-in systems that use automatic speech recognitions for customer service functions such as directory assistance systems.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Embodiments of a system and method enable a user to locate products by dialing a number from any phone and accessing an automatic voice recognition system that provides product location information in the store using the store's product location data which is converted to automatic voice responses. An original taxonomy enables product searches to be requested by product descriptions and/or product brand names. Improved taxonomies allow for synonyms and phonetic enhancements to the system. Improved search results are now related to products and product categories and new algorithms that organize results in a concise manner. Relevant advertisements, promotional offers and coupons are now delivered based upon search and taxonomy elements. Search requests also generate dynamic interior maps of a products location inside the shoppers' location. These maps help a shopper efficiently shop the location for all their products (items) on their lists. Business intelligence of product categories allow for rapid scaling across retail segments.

BRIEF DESCRIPTION OF THE DRAWINGS

Embodiments of the invention relating to both structure and method of operation may best be understood by referring to the following description and accompanying drawings:

FIG. 11 is a pictorial view depicting an example of a store layout map in which a large number of unique product items are mapped to points identified as key landmarks in the store;

FIG. 12 is a data structure diagram illustrating an example of product database including product item names, common synonyms for the product, phonetic spelling, and slang terms for the same listings to increase the probability of correctly matching a product.

DESCRIPTION OF THE PREFERRED EMBODIMENT(S)

Figure 1:
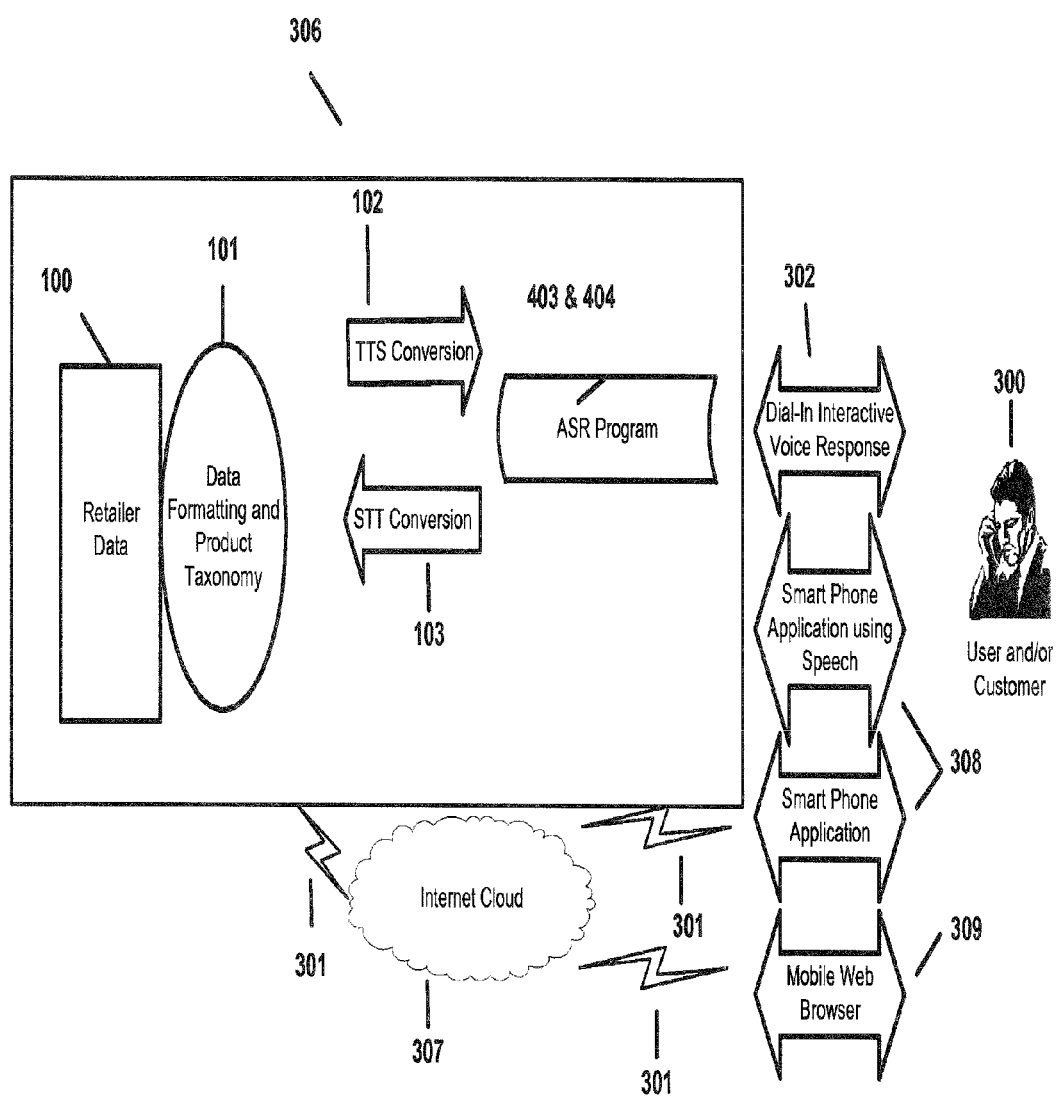
FIG. 1 is a schematic block diagram illustrating an embodiment of a product location system for accessing a product database using voice-to-text and text search.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

Embodiments of a system and method can provide product location information inside a store while using a personal mobile phone or any phone connected to a telecommunications or data communications network such as and including the Internet.

Embodiments of systems and methods disclosed herein allow users and/or customers (referred to collectively herein as "users") to locate products in a store and receive additional requested information using a user's and/or customer's personal mobile phone or a phone system connected to an information network such as the Internet, a commercially-branded toll free or dial-in number, or other suitable communication system. The system can include a voice request/voice response system such as an automatic speech recognition system with interactive voice response tools that use speech-to-text and text-to-speech technology. The communication system connects users to the automatic speech recognition system to receive product location information within a particular site, such as grocery or hardware store. The system accesses the store inventory and/or plan-a-gram information through a converted inventory data standard formatted for integration with a text-to-speech and speech-to-text program. A server generates a real-time voice and/or text response to provide the user with the location of the product within the store. The user can search by product name, product description, brand name, product category, and/or other suitable criteria.

An illustrative voice search and product location assistance (PLA) system and method locate products in stores, businesses and/or organizations by dialing a phone number and using an automatic speech recognition system. The PLA system and method can also be accessed by using a phone application, internet program, and mobile internet program to access product location information either by entering text or using voice recognition to enter the text. A taxonomy of product classifications is searchable by voice or text, with results classified by algorithms that apply related search results and weighted search results. The voice or text search can generate mobile maps of the stores built into the phone app. The maps can route the user through the store based upon multiple search items or items found in a recipe. Relevant advertisements, coupons, and promotional messages can be inserted into the responses of the product location system (PLA) based upon the voice or text search of products. The method of gathering, interpreting, storing, and accessing the product location data is designed to enable rapid response to a product request.

An illustrative product location assistance (PLA) system can be used to locate products in stores, creating new efficiencies in customer service for customers, retailers, businesses and organizations. Embodiments of systems and methods disclosed herein gather, format, access, store, and interact with product data to move the assistance system concept to the product level in the stores, and create a mobile product location assistance (PLA) system accessible from any phone or other communication device.

Various technologies exist that enable customers or users to access kiosks, internal phone systems, mobile text messaging, mobile internet programs and internet connected computers to access a variety of information programs using voice or text search methods to locate product inventory or product pricing from the Internet. Phone dial-in systems are available that use automatic speech recognitions for customer service functions such as directory assistance systems. U.S. application Ser. No. 12/134,187, parent to the present application, describes an operational system and method that enable users to access a product location in a store and additional information from an automated voice based automatic speech recognition system using the user's and/or customer's personal phone devices while in the store or elsewhere when the user and/or customer wants to retrieve the information. The system and method enable a user or customer to use a personal phone device to access product information using a commercially-branded toll-free or dial-in number, and a voice request and voice response systems to retrieve the product location and additional information over the phone. The method enables the user and/or customer to request and receive information via the automatic speech recognition system to locate the product while in the store or from any type of phone, using the toll-free or dial-in number.

Embodiments disclosed herein can utilize a product taxonomy of synonyms, slang, and phonetic data terminology equivalents for products and product brands which, when implemented, enable the system to correctly identify the product requested. Based upon a product search, a map of the site can be shown on a display screen for the user's communication device to provide a visual representation of the location of the product at the site. The user can request multiple products and a mapping component of the system can route the user through the store in the most efficient manner by a series of taps on the screen to go from one product to next product. For example, the mapping function can be used to map items from a single recipe to help the user find all the items needed for the recipe in the store.

Product grammars can enable items to be categorized by most common points in a location. For example, a category management component can take a set of 100,000 individual product items and designate them to smaller subset such as 300 location points or sub-location points in a store, which allows for rapid scaling of stores within the same retailer segments. Search results can be presented in a way that provides a multi-layered response based upon the search terms. The product name or category variables are presented to the user in a comprehensive manner.

Based upon product search within the system, relevant advertisements, promotional offers, and coupons can be matched and inserted into system responses for delivery to the user's communication device immediately with the reply to the search or map of the search item. The product location system provides unique capability to deliver promotional offers and marketing messages.

Referring to FIG. 1, a schematic block diagram illustrates an embodiment of a product location system 90 for accessing a product database using voice-to-text and text search, including functions of data formatting, grammar taxonomy. The product location system 90 includes applications formed to enable access to a product location database to enable a user to receive requested product location information or other available information by an automated response and reply system. The product location system 90 enables users to access and receive product location and other information while shopping in the store using their mobile phone or other communication device. System 90 can include computer server 306 with retailer inventory data 100, a data formatting and product taxonomy module 101, a text-to-speech module 102, a speech-to-text module 103, and automatic speech recognition system 403 and 404. Speech-to-text module 103 converts a user's spoken request to generate input to data formatting and product taxonomy module 101. Text-to-speech module 102 generates audible responses to the user's queries and requests. System 90 can also include components (not shown) that provide text and/or graphical data to a user's communication device in response to a voice or text request from the user.

The text-to-speech 102 and speech-to-text 103 conversion system generates voice responses of a automatic voice response system to provide the user the automated voice responses. smart phone and mobile web access to the product database is enabled using voice-to-text and text search.

Product data in the retailer inventory data 100 can be formatted and configured to include synonyms, slang, phonetics, and category grammar terminology. Product data can be updated or customized for a particular site by taking the retailer inventory information and plotting the products to landmark locations within the stores and on in-store maps or by integrating batches of retailer information with product data to provide more dynamic information accessible by users.

Retailer inventory data 100 is typically converted to a data format that allows text-to-speech module 102 to create automated voice responses to requests from a user via communication network 301 and/or information network 307 such as the Internet from dial-in voice module 302, smart phone application 308, or mobile web browser 309. The output of the speech-to-text module 103 is used to find the correct match in retailer inventory data 100. Text-to-speech module 102 receives information from data formatting and product taxonomy module 101 and creates the voice responses giving product location information.

Automatic speech recognition programs 403 and 404 receive the output of text-to-speech module 102 and provide the requested product location, store location, and additional information to the user. The retailer inventory data 100 can be updated when a retailer updates their internal systems to create up-to-date inventory information and provides updates to system 90.

Figure 2:
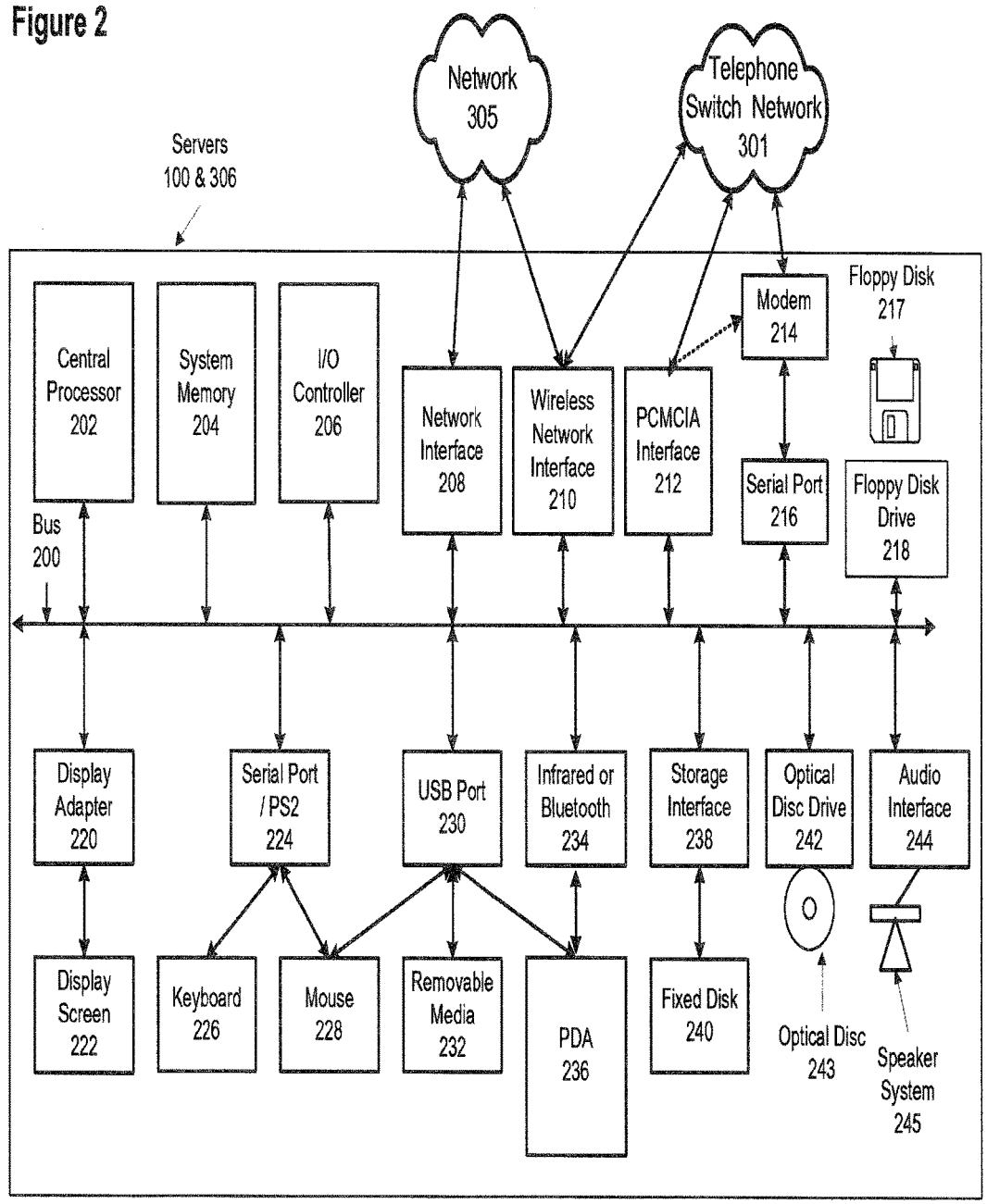
FIG. 2 is a block diagram showing an example of a server that is suitable for use in the system of FIG. 1.

Referring to FIG. 2, a block diagram shows an embodiment of a server 306, for example a workstation or computer, which is suitable for use in the product location system 90 in FIG. 1. FIG. 2 shows the computer server or workstation and components that enable an automatic speech recognition system, storage of product taxonomy grammars, mobile location maps, advertisements, coupons, promotional offers, an interactive voice response systems, product inventory information, speech to text and text to speech systems, and product category searchable database to be accessible by the user and/or customer.

Referring to FIGS. 1 and 2 in combination, one or more workstations or computers can be used to implement server (or servers) 306 to load and run logic instructions for performing the tasks involved in receiving a user's request, locating product information, responding by sending the product information to the user, and other tasks performed by a speech and data server 306. A server 306 is depicted with various components 200 through 245, and can include a bus 200 for interconnecting subsystems of a computer such as a central processor 202, a system memory 204 (typically RAM, but which may also include ROM, flash RAM, or the like), an input/output controller 206, a network interface 208, wireless network interface 210, Personal Computer Memory Card International Association (PCMCIA) interface 212, serial ports 216 coupled to modem 214, external drive interface 218, display adapter 220 coupled to display screen 222, serial ports 224 coupled to keyboard 226 and mouse 228, USB port 230 configured to interface with removable media and various peripherals such as printers, external drives, etc., infrared or Bluetooth interface 234 configured to communicate with a personal communication device 236, storage interface 238 coupled to fixed disk drive 240, optical disk drive 242 configured to read and write optical disk 243, and audio interface 244 configured to interface with speaker system 245.

Bus 200 enables data communication between central processor 202 and system memory 204, which may include both Read Only Memory (ROM) or flash memory (neither shown), and Random Access Memory (RAM) (not shown), as previously noted. The RAM is generally the main memory into which the operating system and application programs are loaded and typically affords at least 16 megabytes of memory space. The ROM or flash memory may contain, among other code, the Basic Input-Output System (BIOS) which controls basic hardware operation such as the interaction with peripheral components. Applications resident with computer are generally stored on and accessed via a computer readable medium, such as a hard disk drive (e.g., fixed disk 240), an optical drive (e.g., CD-ROM drive 242), or other storage medium. Additionally, applications may be in the form of electronic signals modulated in accordance with the application and data communication technology when accessed via network modem 214 or network interface 208.

Storage interface 238 and other optional storage interfaces of server 306 may connect to a standard computer readable medium for storage and/or retrieval of information, such as a fixed disk drive 240. Fixed disk drive 240 may be a part of server 306 or may be separate and accessed through other interface systems. Many other devices can be connected such as the mouse 228 connected to bus 200 via serial port 224, a modem 214 connected to bus 200 via serial port 216 and the network interface 208 connected directly to bus 200. Modem 214 may provide a direct connection to a remote server via a telephone link or to the Internet via an Internet Service Provider (ISP). Network interface 208 may provide a direct connection to a remote server via a direct network link to the Internet via a POP (point of presence). Network interface 208 may provide such connection using various communication links, such as a dial-up wired connection with a modem, a direct link such as a T1, ISDN, or cable line, a wireless connection through a cellular or satellite network, or a local data transport system such as Ethernet or token ring over a local area network.

Many other devices or subsystems (not shown) may be connected in a similar manner (e.g., bar code readers, document scanners, digital cameras and so on). Conversely, other arrangements may include less than all of the devices shown in FIG. 2 while still practicing embodiments of the illustrative system and methods. Devices and subsystems may be interconnected in different ways from that shown in FIG. 2. The operation of a computer system such as that shown in FIG. 2 is readily known in the art and is not discussed in detail in this application. Code to implement the present invention may be stored in computer-readable storage media such as one or more of system memory 204, fixed disk 240, CD-ROM 243, or external disk drive 218. Additionally, server 306 may be any kind of workstation or computing device, and so includes personal data assistants (PDAs), network appliance, desktop, laptop, X-window terminal or other such computing devices. The operating system provided on computer 190 may be MS-DOS®, MS-WINDOWS®, OS/2®, UNIX®, Linux® or other known operating system. Server 306 also supports a number of Internet access tools, including, for example, an HTTP-compliant web browser having a JavaScript interpreter, such as Netscape Navigator®, Microsoft Explorer® and the like.

One or more servers 306 can be configured as an information-handling system comprising a controller, for example central processor 202 or other control unit or processor, configured to receive a request originating from a user-phone and communicated via a telecommunications and/or data communication network 305. The request can inquire of the location of a product within a product-housing structure such as a store, warehouse, or other business or organization building. The controller can further be configured to identify location of the product in the product-housing structure according to a taxonomy including synonyms, slang, and phonetic data.

The information-handling system can be formed with the controller configured to receive a product request from a user via the user-phone, with the product request in various forms, and interpret the product request according to a product taxonomy database containing product names, synonyms, phonetic pronunciations, and slang terms. The product item can be identified according to the interpreted product request.

In some embodiments the controller can be further configured to offer additional product information to the user according to the product request and send the user a voice response prompt or text prompt for requesting the additional product information. The controller can manage a database of additional product information by selectively adding, removing, and updating the additional product information. The controller can be further configured to access the database of additional product information according to the product request, and return accessed information to the user.

In some embodiments the controller can be further configured to create a custom product taxonomy for usage in matching a variety of terms for a product to increase probability of a match to a user request.

In other embodiments of the information-handling system, the controller can be configured to convert inventory data and product location information into automated product location prompts accessible by the user-phone connected to the telecommunications and/or data communication network.

Some embodiments of the information-handling system can include a controller configured to specify a plurality of sub-location landmarks in a location, map a predetermined larger number of item locations to the specified sub-location landmarks, and create a predetermined smaller number of identifiable points for users to locate items at the item locations.

Figure 3:
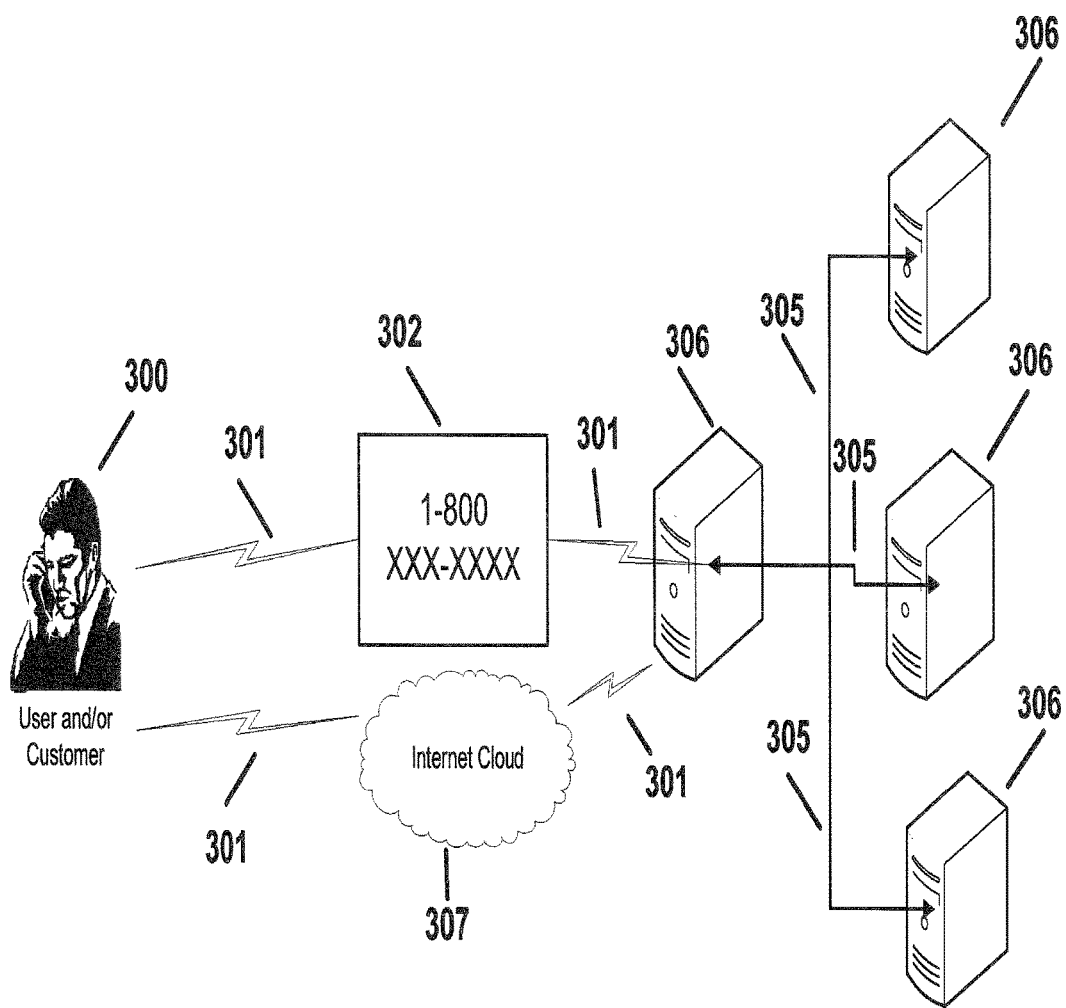
FIG. 3 is a pictorial block diagram depicting an embodiment of a method for requesting product location information in a store using the system of FIG. 1.

Referring to FIG. 3, a pictorial block diagram depicts an embodiment of a method for requesting product location information in a store using the system of FIG. 1. Product location information is stored on one or more servers 306 using unique grammar taxonomy (including product category synonyms, slang, phonetics, and category terminology) to provide a robust searchable product database, an automatic speech recognition systems, an interactive voice response tools that use speech-to-text and text-to-speech methods to create automated voice responses to inquires, indoor maps that show where a product is located and route the user through the store locate all the items searched for inside the store.

FIG. 3 depicts a process for using the system and method to access product data. A user and/or customer 300, for example communicating via smart phone, can use an application executing on the phone or the mobile web to send a text request over the network 301 to access information on servers 306 arranged in a redundant bank 305 of servers 306. Otherwise, the user 300 can dial a number (for example, a 1-800 number) of an access system 302 make available by a service provider which connects the user to a bank 305 of servers 306 using an automatic speech response system 403 and 404, shown in FIG. 1, to receive product location information, thus providing access for a product request via a dial-in number which enables ubiquitous access.

An illustrative information-handling method can comprise receiving a request originating from a user-phone, for example a personal mobile phone or any phone connected to a network 310, and communicated via a telecommunications and/or data communication network 301 such as and including the Internet. The request can specify a product location within a product-housing structure such as a store, business, and/or other organization. The method can further comprise identifying the product location in the product-housing structure according to a taxonomy including synonyms, slang, and phonetic data.

The method can further comprise responding to the request by sending the identified product location to the user-phone via the telecommunications and/or data communication network 301.

In some embodiments, the method can further comprise receiving a product request from the user-phone. The product request can be converted using voice recognition technology speech-to-text functionality.

Inventory data and product location information can be converted into automated product location prompts accessible by the user-phone connected to the telecommunications and/or data communication network 301.

The information-handling method can further comprise building a mobile/web map of a product-housing structure including a visual representation of items on the map. The map can further include visual directions to a product location from a stationary point from within a store, warehouse, or other product-housing structure. Maps can be displayed inside the mobile application to visually represent where a product or item is located. The maps are dynamic and can route the user from product (item) location to product (item) location inside a venue.

The method can also comprise determining a most efficient shopping route in the product-housing structure using product location points on the mobile/web map. The efficient route can be determined by applying destination mapping software to the mobile/web map.

In some embodiments and applications, the method can further comprise specifying a plurality of sub-location landmarks in a location and mapping a predetermined larger number of item locations (for example hundreds or thousands) to the specified sub-location landmarks. A predetermined smaller number of identifiable points (for example less than one hundred) can be created for users to locate items at the item locations.

The illustrative information-handling method can further comprise receiving a product request from a user via the user-phone. The product request can be expressed in various forms. The product request can be interpreted according to a product taxonomy database containing product names, synonyms, phonetic pronunciations, and slang terms. A product item can be identified according to the interpretation of the product request.

Another functionality that can be performed in the information-handling method is handling of additional product information. The method can comprise receiving a product request from a user via the user-phone and offering additional product information to the user according to the product request. For example, the user can be sent a voice response prompt or text prompt which requests the additional product information. A database of additional product information can be managed including selectively adding, removing, and updating the additional product information. The database of additional product information can be accessed according to the product request with accessed information communicated to the user.

The information-handling method can enable access to product information using various techniques. For example, product information can be accessed using a smart phone application or by using a mobile website. The method can also enable access and request of voice automated directions to a product location from a stationary point from within a business or organization.

Figure 4:
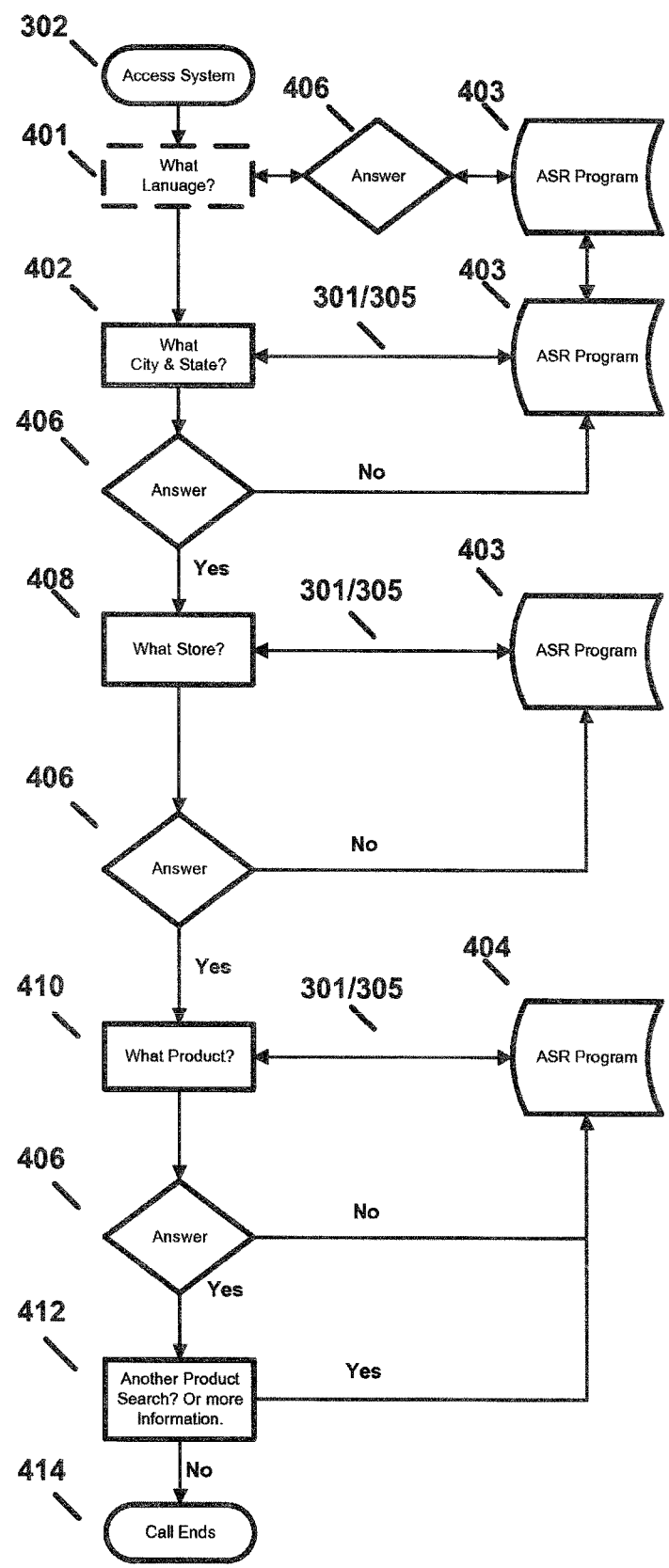
FIG. 4 is a flow diagram illustrating an embodiment of a process performed by a user and/or customer for requesting and receiving product location and other information in the store provided by the system of FIG. 1.

Referring to FIG. 4, a flow diagram illustrates an embodiment of a process performed by a user and/or customer for requesting and receiving product location and other information using a voice-automated process. In the illustrative example, the access system 302 shown in FIG. 3 enables an automatic speech recognition (ASR) system 403 executing on the bank 305 of servers 306 to ask a series of questions for routing the user and/or customer to an appropriate store location to find the product. The ASR system 403 determine the user's spoken language 401, for example by requesting specification of language and receiving the answer 406 or by sampling and analyzing speech of the user, and, based on the language choice, requests the city and state location 402 of the user. The ASR system 403 proceeds with the series of questions including, for example, store name 408 and product 410. Based upon the user and/or customer responses 406, the access system 302 provides the appropriate data and, using a text-to-speech tool, creates a voice response for the requested product location.

The language question 401 can be requested by the system only the first time a user accesses the system. The system can match the language choice of the user and/or customer to the number from which the user and/or customer is calling and can always use that language choice when called from that number unless specifically requested otherwise within the system by the user and/or customer, eliminating the inconvenience of prompting the user for language choice after the first use of the system.

In an example interaction, the system can prompt (401): "What language?" The user and/or customer 300 responds: "English." The ASR system 403 chooses a server bank 306 configured for the English language. English is the language always used when the caller calls the ASR system 403 and the appropriate server bank 306 is matched to the phone number.

Next, the ASR system 403 prompts (402): "What City and State?" If the user and/or customer 300 responds: "Chicago, Ill.," the ASR system 403 matches the answer (yes) and chooses the appropriate server bank 306 for Chicago, Ill. The ASR system 403, if unable to match the answer (no), prompts (402) the user with the same question.

The ASR system 403 can then prompt (408): "What Store?" If the user and/or customer 300 responds: "Store Name," the system 403 matches the answer (yes), provides more information to select the particular store location (no), or does not match (no) and repeats the question 408.

At the product level, an ASR system 404 can proceed with a prompt (410): "What Product?" The user and/or customer 300 can respond, for example: "duct tape or 3M or 3M duct tape." The ASR system 404 can match the answer (yes) and produce the correct location and other information made available by the store, or provides information that the product is not available in the store. The ASR system 404, if failing to match the answer (no), repeats the question 410.

Once the user and/or customer 300 receive the requested information, the ASR system 404 can request 412 whether the user and/or customer 300 would like to locate another product or more information. If yes, the ASR system 404 returns the user and/or customer 300 to question 410. If no, the call will terminate 414. If the user and/or customer 300 hang up the phone anytime during the call, the call will also terminate 414.

Figure 5:
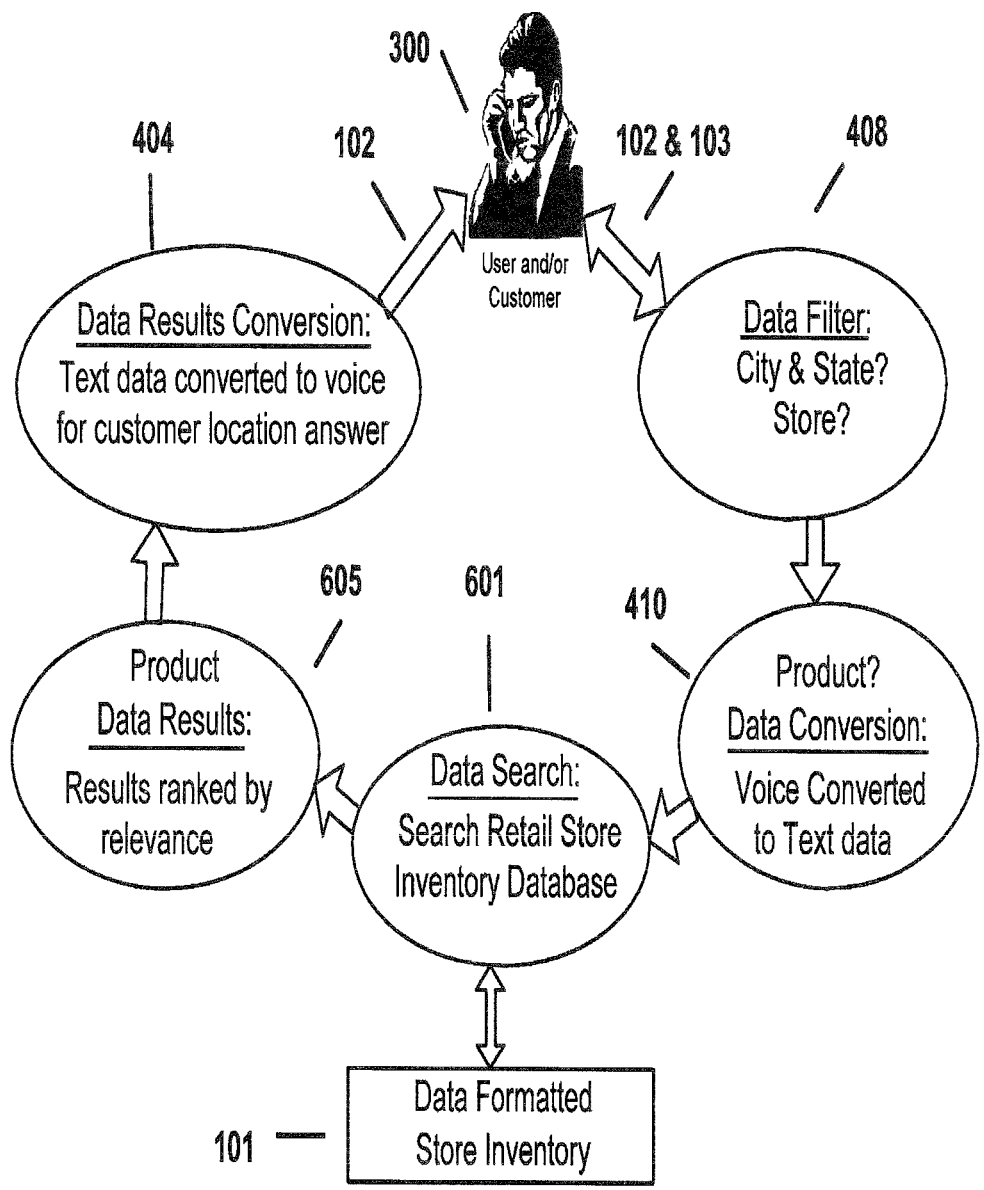
FIG. 5 is a flow diagram showing an embodiment of a method using automatic speech recognition tools in the system of FIG. 1 to search, locate, and cause the system to create a real time voice prompt for the user and/or customer in response to a request for product location and other information.

Referring to FIG. 5, a flow diagram shows an embodiment of a method using automatic speech recognition tools depicted in the system of FIG. 1 to search, locate, and cause the system to create a real time voice prompt for the user and/or customer in response to a request for product location and other information. The system operates through user and/or customer 300 interaction with the automatic speech recognition (ASR) system 403 and 404 via a series of questions using speech-to-text 103 and text-to-speech 102 modules, enabling routing of the user and/or customer 300 to the appropriate location and store inventory data 101. In the user-ASR interaction, the ASR 403 operates as a data filter 408 to identify the location (city and state) and store according to voice signals from the user 300. The ASR 404 performs data conversion 410, converting voice to text data, and sending the text data corresponding to the product query from the user 300, and performs a data search 601 to search the retail store inventory database. The data search 601 is made of a data formatted store inventory 101. Results of the data search 601 are arranged and formatted as product data results 605 with the results ranked by relevance, providing information about product availability in the store. The ASR system 404 performs data results conversion, converting text data to voice for supplying the customer location data. Thus, the automatic speech recognition system 404, upon matching the correct item, creates a voice response using the text-to-speech tool 102 for sending to the user and/or customer 300 based upon the user and/or customer's requested match.

The illustrative embodiment of the product location assistance (PLA) system can be added to existing and/or new directory assistance systems as an additional level of information for user access.

Figure 6:
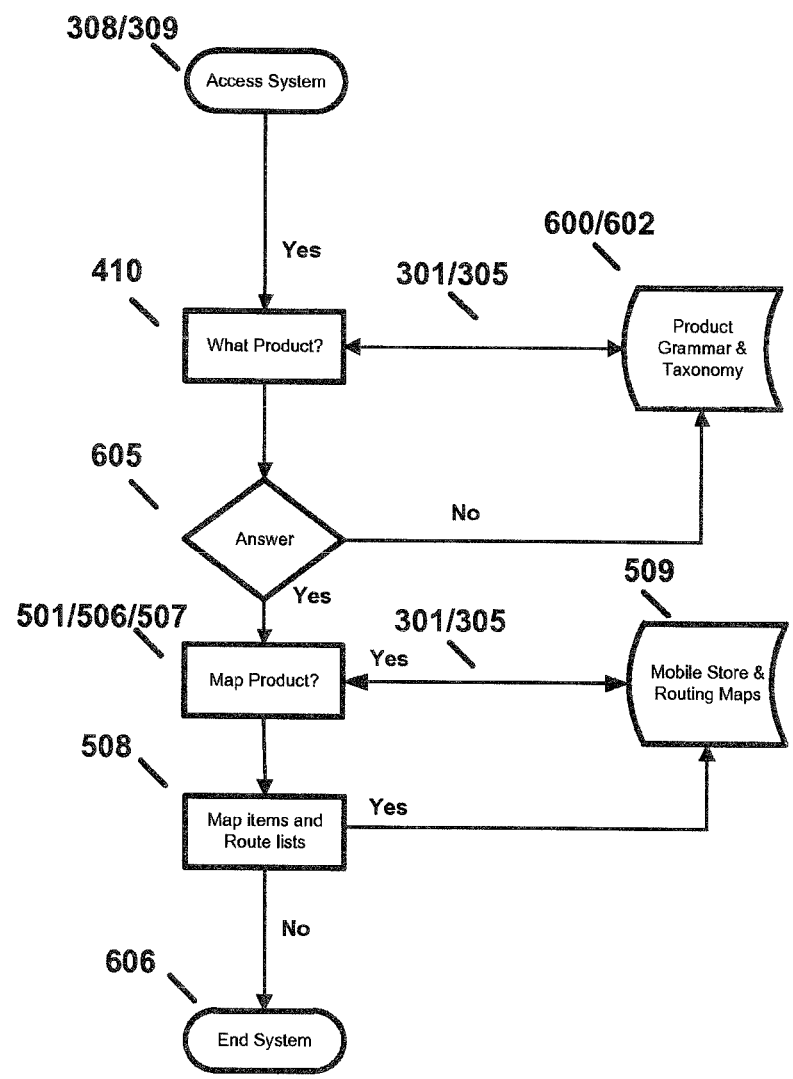
FIG. 6 is a flow diagram depicting an embodiment of a process for requesting and receiving product location information and store maps.

Referring to FIG. 6, a flow diagram depicts an embodiment of a process for requesting and receiving product location information and store maps. Operation of the system can be implemented using a smart phone application, a mobile web interface, or other suitable telecommunications device. For example, the user and/or customer 300 can dial a toll free or dial in number from any phone to use the system, open a smart phone application using voice or text to search, or a mobile web browser and customer designated domain to search for products. The user enters a product request via an access system such as a telephone or mobile phone 308 or mobile website 309 and, using text or voice-to-text tools, sends the request to the product location assistance system. The user and/or customer access the system by opening an application on their phone 308 or going to a mobile website 309. The user requests a product 410 and the access system forwards the request over a network 301 to a bank 305 of servers 306 to search a database 600 of product taxonomy grammars and receive a result decision 602. The system responds with an answer, for example returning 605 the answer or result to the user's phone, and offers to map the product on a store map. The user has an option to map the product 501, shopping lists 506, or recipe items 507 using mobile store and routing maps 509 to the map to route the user through the store 508 which maps items and route lists for as many items are requested. When the requests are exhausted, the process is terminated 606.

Figure 7:
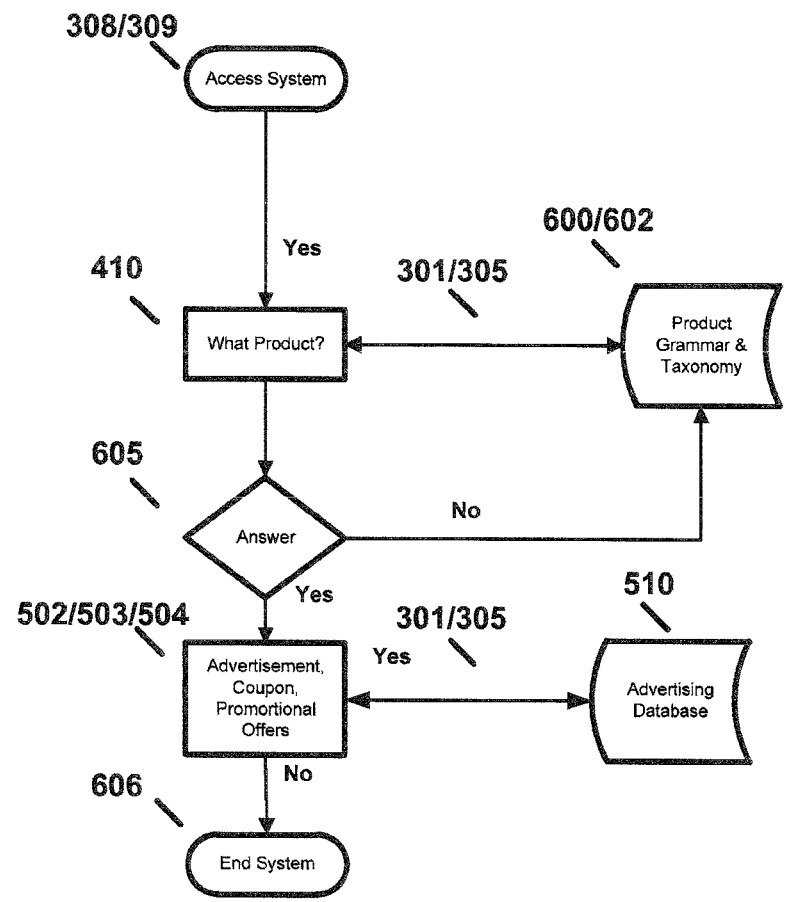
FIG. 7 is a flow diagram illustrating an embodiment of a process for requesting and receiving product location information including additional advertisements, coupons, and promotional offers.

Referring to FIG. 7, a flow diagram illustrates an embodiment of a process for requesting and receiving product location information including additional advertisements, coupons, and promotional offers. The process inserts the advertisements, coupons, and promotional offers to users based upon the users' product requests. The user can enter a product request using text or voice-to-text tools which send the request to the product location assistance system, the system responds with an answer and include related advertisements, coupons, and or promotional offers on the response page or other related pages. The user and/or customer access the system by opening an application on their phone 308 or accessing a mobile website 309. The user requests a product 410, forwarding the request over a network 301 to a bank 305 of servers 306 to search a database 600 of product taxonomy grammars and receive a result decision 602, and returning 605 the resulting answer to the user's phone. The system can insert advertisements 502, coupons 503, and/or promotional offer 504 based upon the users search request. When the requests for advertisements, coupons, and promotional offers are exhausted, the process is terminated 606.

Figure 8:
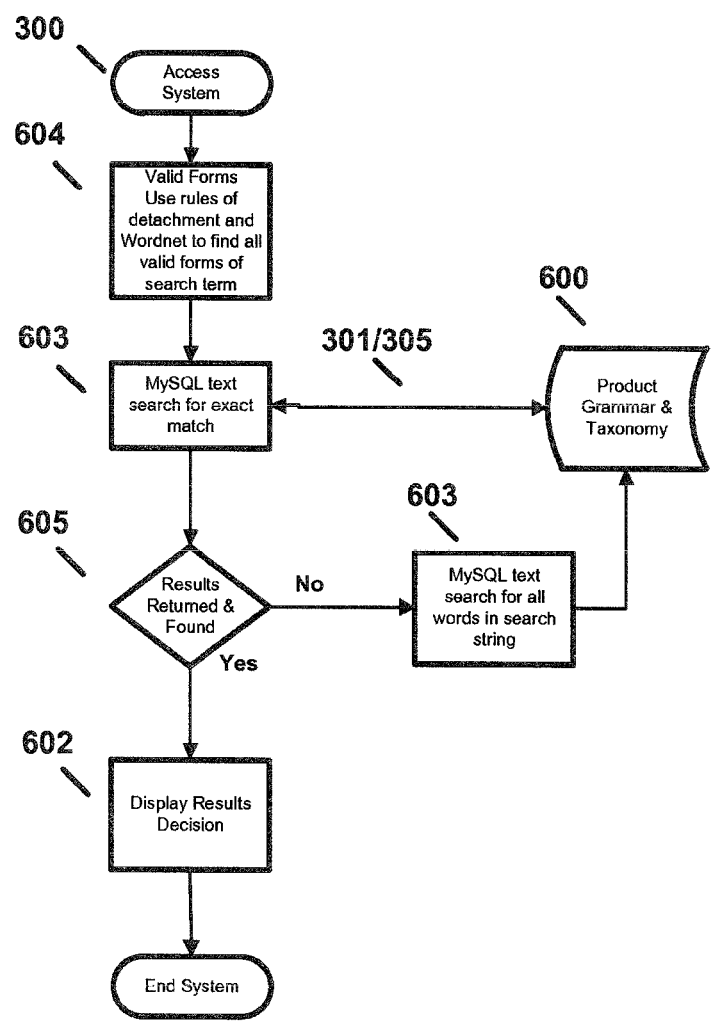
FIG. 8 is a flow diagram showing an embodiment of a process for matching results based upon input from the user that can be performed in the system of FIG. 1.

Referring to FIG. 8, a flow diagram shows an embodiment of a process for matching results based upon input from the user that can be performed in the system of FIG. 1. The system and associated method create unique search results for related product terms based upon a product request. The system can perform an exact match look-up based upon user input. If results are found, the system displays the results. If no results are found, the system performs another look-up based upon terms in the request to provide as many result variables as possible. The user and/or customer access the system by opening an application on their phone 308 or accessing a mobile website 309. The user 300 requests an item and the system uses rules of detachment and WordNet 604 to match all valid forms of the search term. WordNet is a lexical database for the English language which groups English words into sets of synonyms called "synsets", to supply short, general definitions. WordNet records the various semantic relations between these synonym sets. The system searches the database 603, for example using a MySQL text search, to determine an exact match of the search of product grammar and taxonomy 600. The database search 603 can be performed via a request over a network 301 to a bank 305 of servers 306 to search a database 600 of product taxonomy grammars. The database search 603 provides results 605. If an exact match is not found the system does another search on 603 for all words in the search string and matches all variables and displays the results decision 602 to the user.

Figure 9:
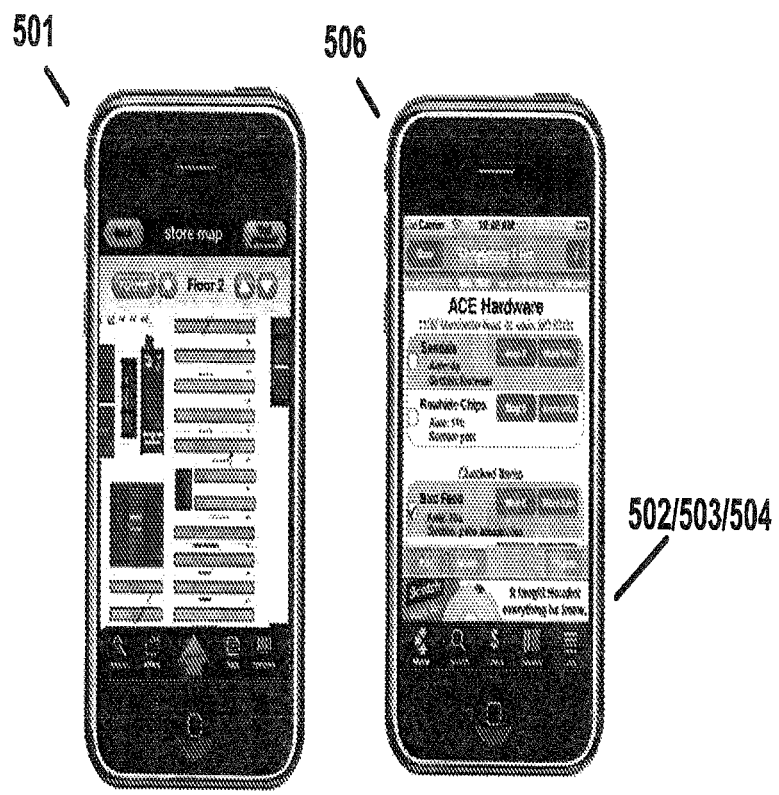
FIG. 9 is a pictorial view depicting examples of maps and product results displayed on a smart phone that can be generated in the system of FIG. 1.

Referring to FIG. 9, a pictorial view depicts examples of maps and product results displayed on a smart phone that can be generated in the system of FIG. 1. In an example application, a store map 501 and shopping lists 506 can be displayed on the phone. The phone can also display advertisements 502, coupons 503, promotional offers 504, and the like which can be inserted into the product location system.

Figure 10:
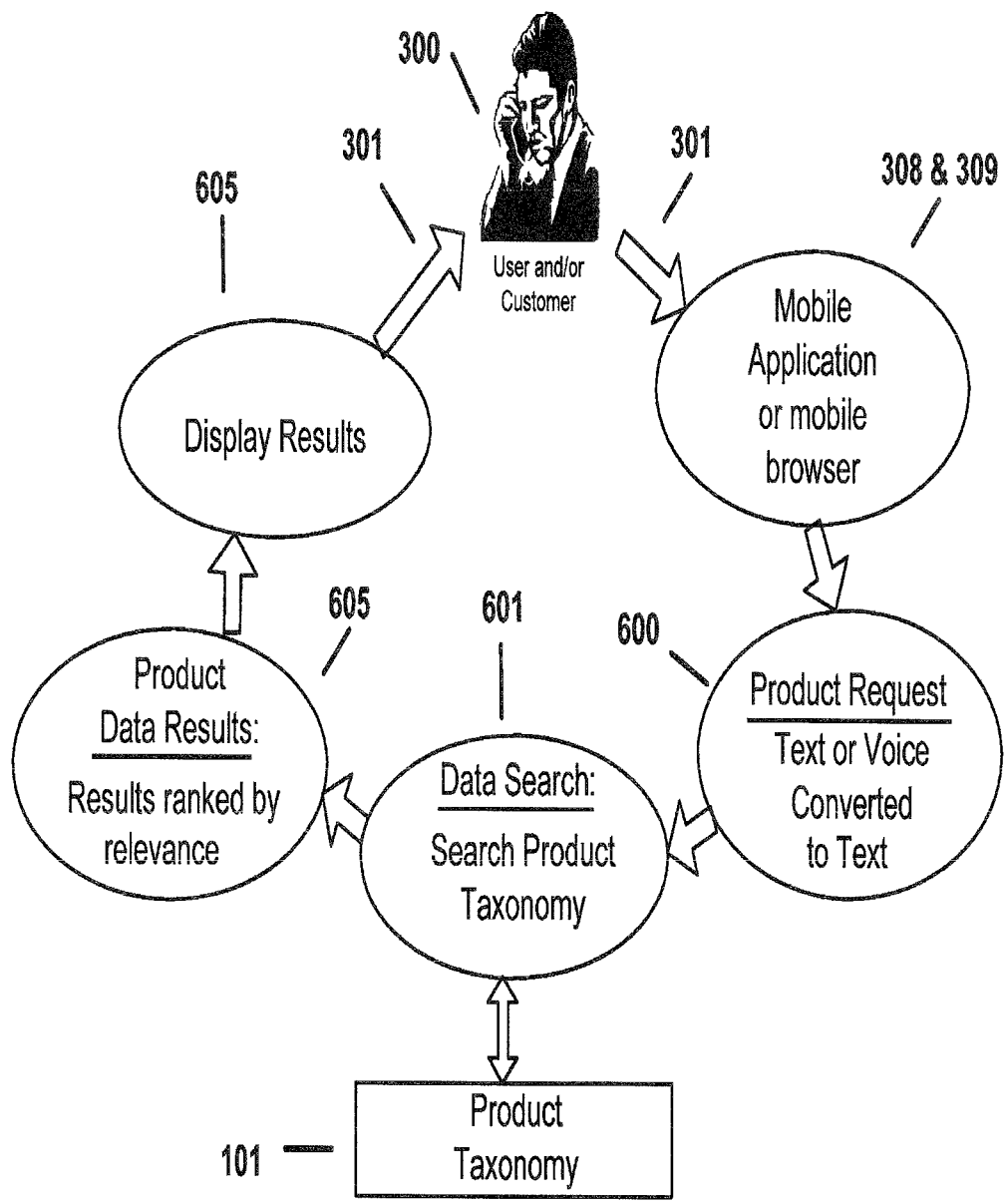
FIG. 10 is a flow diagram showing an embodiment of a process for searching, locating, and creating a result for the user and/or customer in answer to a product location request in the system of FIG. 1.

Referring to FIG. 10, a flow diagram shows an embodiment of a process for searching, locating, and creating a result for the user and/or customer in answer to a product location request in the system of FIG. 1. The system and method can be used by a user and/or customer 300 to locate product information using an application smart phone 308 and/or mobile website 309 to request products over a network 301. The user makes a product request over the network 301 to search a database 600 of product taxonomy grammars. The product request 600 in the form of text or voice is converted to text and used to perform a data search 601 to search the product taxonomy in a data formatted store inventory 101. Results of the data search 601 are arranged and formatted as product data results 605 with the results ranked by relevance, wherein the product request 600 is matched against the product database and taxonomy 101 and results are displayed 605 to the user.

Referring to FIG. 11, a pictorial view depicts an example of a store layout map in which a large number of unique product items are mapped to points identified as key landmarks in the store. In the illustrative example, the system and associated method can map 100,000 unique product terms to a store map of 300 location points inside the location using category management and business intelligence 608 for the products, enabling large numbers of product items in complex arrangements to be reduced to sublocation landmarks inside venues to enable rapid duplication from same-store segmentation. The large number of items can be reduced to a smaller number of location points in the store to quickly map the items to appropriate locations inside the store.

Referring to FIG. 12, a data structure diagram illustrates an example of product database including product item names, common synonyms for the product, phonetic spelling, and slang terms for the same listings to increase the probability of correctly matching a product. The illustrative product taxonomy database 101 includes product names, common synonyms, phonetic pronunciations, and slang terms to provide a comprehensive database match for user and or customer of the system in a unique way to build searchable databases.

The illustrative method can further comprise creating a custom product taxonomy for usage in matching a variety of terms for a product to increase probability of a match to a user request. For example, terms can be entered into the database in the predetermined data structure as new products are placed into inventory along with generic product names, synonyms and slang terms used in various cultural groups, and phonetic pronunciations taking into account various dialects.

Figure 13:
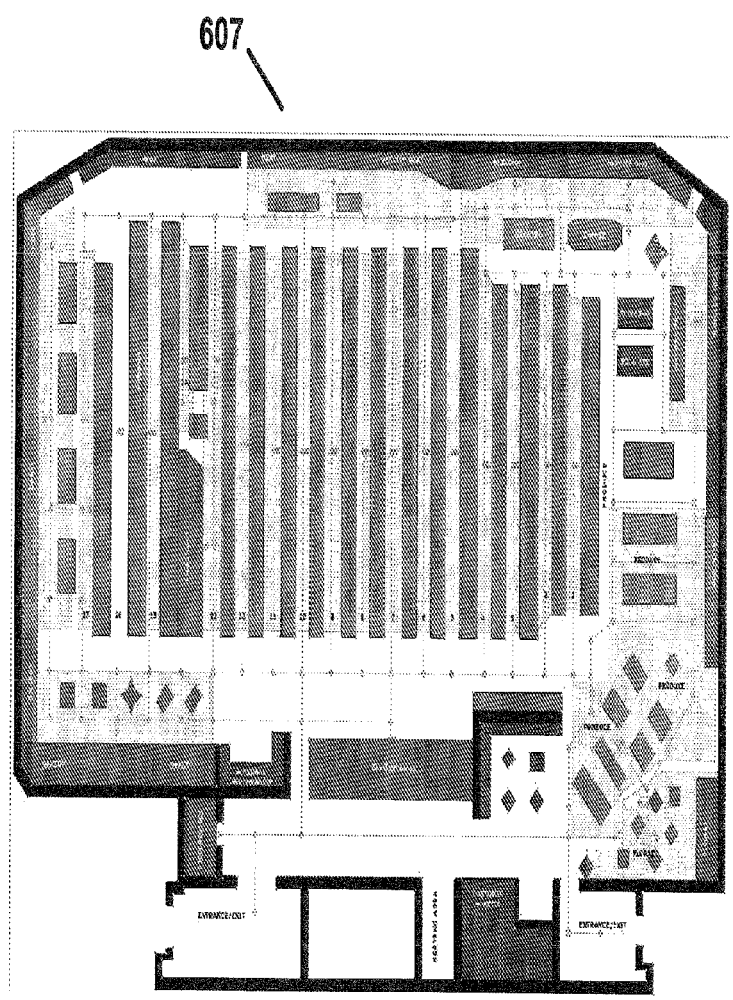
FIG. 13 is a pictorial view showing an example of a mobile/web store map for visually locating products in store using the system of FIG. 1.

The method can further comprise forming a product taxonomy database which defines the custom product taxonomy. The product taxonomy database can contain terms including product names, synonyms, phonetic pronunciations, and slang terms. The product taxonomy database can further contain additional product information including product-related advertisements, coupons, and promotional offers based on product taxonomy Referring to FIG. 13, a pictorial view shows an example of a mobile/web store map for visually locating products in store using the system of FIG. 1. A mobile/web map 607 can be built and used in the application to provide a visual representation of where a product can be found using the illustrative system and method disclosed herein.

The illustrative system and method provides a variety of ways to find product locations inside a store including a dial-in interactive voice response system 403 and 404 which is configured to use voice signals to locate products and product information in stores. A smart phone application 308 and mobile website 309 are configured to access the same product database using text or voice-to-text tools. The user and/or customer 300 can make product requests by product description, product synonyms, phonetic terms, or slang terms to enable access the product. These improvements enable the user and/or customer 300 to facilitate location of products in stores themselves using a phone, creating new efficiencies in customer services.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a usage process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

The invention claimed is:

1. A computer-implemented method for product location assistance in a retail location, said method comprising executing on a processor the method steps of:
    receiving retailer inventory data about a plurality of products, said inventory data comprising a location of said products in a retail store;
    formatting said received retailer inventory data to include a programmatically searchable taxonomy for said products, said taxonomy including slang, synonyms, and phonetic data and formatted in plaintext;
    receiving from a mobile smart phone of a user over a data communications network a user search request comprising an indication of a desired product, said desired product being a product in said plurality of products, and said user search request being received via a smart phone application executing on a processor of said mobile smart phone;
    identifying a location of said desired product in said retail store, said identification based at least in part on matching said indication of said desired product to said plaintext taxonomy for said desired product;
    sending to said mobile smart phone over said data telecommunications network an indication of said identified location of said desired product in said retail store.

2. The method of claim of claim 1, wherein said data telecommunications network is the Internet.

3. The method of claim 1, wherein said mobile smart phone application is a web browser.

4. The method of claim 1, said method further comprising executing on said processor of said mobile smart phone the method steps of:
    displaying on a display of said mobile smart phone a map of said retail store;
    displaying on said displayed map of said retail store a graphical representation of said identified location at a location on said displayed map corresponding to said identified location in said retail store.

5. A non-transitory machine-readable storage medium having stored thereon a computer program for product location assistance in a retail location, said computer program comprising a set of instructions for causing the machine to perform the steps of:
    receiving retailer inventory data about a plurality of products, said inventory data comprising a location of said products in a retail store;
    formatting said received retailer inventory data to include a programmatically searchable taxonomy for said products, said taxonomy including slang, synonyms, and phonetic data and formatted in plaintext;
    receiving from a mobile smart phone of a user over a data communications network a user search request comprising an indication of a desired product, said desired product being a product in said plurality of products, and said user search request being received via a smart phone application executing on a processor of said mobile smart phone;
    identifying a location of said desired product in said retail store, said identification based at least in part on matching said indication of said desired product to said plaintext taxonomy for said desired product;
    sending to said mobile smart phone over said data telecommunications network an indication of said identified location of said desired product in said retail store.

6. The medium of claim 5, wherein said data telecommunications network is the Internet.

7. The medium of claim 6, wherein said mobile smart phone application is a web browser.

8. The medium of claim 7, wherein said computer program further comprises a set of instructions for causing the machine to perform the steps of causing said mobile smart phone processor to:
    display on a display of said mobile smart phone a map of said retail store;
    display on said displayed map of said retail store a graphical representation of said identified location at a location on said displayed map corresponding to said identified location in said retail store.

* * * * *